United States Patent [19]

Cunningham

[11] Patent Number: 4,698,791
[45] Date of Patent: Oct. 6, 1987

[54] ACOUSTIC WELL LOGGING METHOD FOR IMPROVED AMPLITUDE DATA ACQUISITION

[75] Inventor: Allen B. Cunningham, Houston, Tex.

[73] Assignee: Exxon Production Research Company, Houston, Tex.

[21] Appl. No.: 875,144

[22] Filed: Jun. 17, 1986

[51] Int. Cl.⁴ .............................................. G01V 1/40
[52] U.S. Cl. ..................................... 367/25; 367/28; 367/30; 367/56; 181/102
[58] Field of Search .............................. 367/25, 28–30, 367/56; 181/102

[56] References Cited

U.S. PATENT DOCUMENTS

| | | | |
|---|---|---|---|
| 2,708,485 | 5/1955 | Vogel | 367/26 |
| 2,868,311 | 1/1959 | Tullos | 367/25 |
| 3,208,548 | 9/1965 | Levin et al. | 367/30 |
| 3,270,316 | 8/1966 | Walker, Jr. et al. | 367/28 |
| 3,302,166 | 1/1967 | Zemanek | 367/27 |
| 3,304,536 | 2/1967 | Kokesh | 367/27 |
| 3,304,537 | 2/1967 | Schwartz | 367/27 |
| 3,524,162 | 8/1970 | Zill | 367/28 |
| 3,991,850 | 11/1976 | Escarar | 181/102 |
| 4,346,460 | 8/1982 | Schuster | 367/27 |
| 4,460,986 | 7/1984 | Millouet et al. | 367/27 |

FOREIGN PATENT DOCUMENTS 1582714  1/1981  United Kingdom .

Primary Examiner—Nelson Moskowitz
Attorney, Agent, or Firm—Alfred A. Equitz

[57] ABSTRACT

An acoustic well logging method employing a tool having at least two acoustic transmitters and at least two acoustic receivers. In a preferred embodiment, one receiver is positioned midway between the two transmitters, and the other receiver is spaced from the first receiver along the longitudinal axis of the tool between the transmitters. Two signals, each representing an acoustic wave that has propagated from a transmitter through a portion of the formation surrounding the borehole to a receiver, are recorded when the tool is in each of two positions relative to the longitudinal axis of the well. In each of the tool positions, one recorded signal is associated with the midpoint receiver and the other with another receiver. From the four recorded signals, a new signal is generated. This derived signal has Fourier amplitude spectrum indicative of the formation parameters, but is independent of components associated with the transmitters and receivers. Thus the method results in amplitude information that is neither corrupted by variations in the sensitivity between the various receivers and transmitters, nor by variations in sensitivity of any individual transducer over time. In an alternative preferred embodiment, the positions of the transmitters and receivers in the tool are interchanged. In variations on the preferred embodiments, three or more pairs of recorded signals are generated.

13 Claims, 3 Drawing Figures

ACOUSTIC WELL LOGGING METHOD FOR IMPROVED AMPLITUDE DATA ACQUISITION

FIELD OF THE INVENTION

This invention relates to acoustic well logging methods. More specifically, the invention relates to acoustic well logging methods employing a multiple-transmitter, multiple-receiver tool to generate acoustic waves which propagate through a subterranean formation traversed by a borehole, and thereafter are detected and recorded for subsequent amplitude analysis.

BACKGROUND OF THE INVENTION

It has long been known in the investigation of subterranean earth formations traversed by a borehole that measurements or "logs" of acoustic energy introduced into the formation can yield extremely useful information about various formation parameters and characteristics. Accordingly, it is conventional to introduce a logging tool into a borehole containing some form of acoustic wave transmitter and receiver, to direct acoustic energy from the transmitter into the formation adjacent the borehole elevation of interest, and thereafter to record with the receiver the resultant acoustic waves returning from the formation. Some types of conventional logging tools include more than one acoustic transmitter and more than one acoustic receiver.

Parameters useful in the evaluation of oil and gas reservoirs, other mineral deposits and certain engineering problems may be derived from the amplitudes of acoustic well logging data. However, there are differences in the individual transmitter and receiver sensitivities of any acoustic logging tool. If one attempts to make relative amplitude estimates by comparing values associated with different transmitters and receivers, the estimates will be adversely influenced by these sensitivity differences. Furthermore, with conventional technology, it does not appear that the transmitter (or transmitters) and receiver (or receivers) of an acoustic logging tool can be constructed so as to maintain the required amplitude sensitivity tolerances over the duration of a normal logging run. What is needed is a method for deriving necessary corrections from the amplitude data themselves.

Prior art techniques do not solve the problem of how substantially to eliminate the problem of variation in both transmitter and receiver sensitivity. For example, the multiple acoustic receiver and transmitter system described in U.S. Pat. No. 3,524,162, issued Aug. 11, 1970 to Zill, employs an acoustic logging tool having two transmitters (T and t), and two or more receivers located between the transmitters. Zill teaches that four signals should be recorded, each received at one of a pair of receivers ($R_1$ and $R_2$) in response to transmission of acoustic energy from one of the transmitters (T or t). Zill assumes that the signals emitted by the two transmitters have identical amplitude, and then proceeds to correct the data for the effects of the transmission factors ($h_a$, $h_b$, $h_c$, and $h_d$) corresponding to the lateral portion (i.e. the portion perpendicular to the well axis) of the acoustic wave path of each recorded signal, and for the transfer coefficients ($g_1$ and $g_2$) of the receivers, by multiplying together the two amplitude ratios formed from each pair of recorded signals associated with the same transmitters. Zill does not suggest how to correct for differences in sensitivity (or other characteristics) between the two transmitters employed.

As described in U.S. Pat. No. 3,302,166, issued Jan. 31, 1967 to Zemanek, it is conventional to employ a tool with a transmitter positioned between two pairs of receivers for logging the travel time of acoustic logging signals as follows. The transmitter is fired and the resulting acoustic arrival recorded at one pair of receivers (the "first" pair). Then the tool is moved to a new location in the well such that the other pair of receivers (the "second" pair) spans the same portion of the formation originally spanned by the first pair of receivers. Then, the transmitter is fired again and the resulting acoustic arrival is recorded at the second pair of receivers. These two pairs of recorded signals are used to correct the data for the effect of unequal distances traveled through the borehole fluid between different ones of the recorded arrivals. Similarly, U.S. Pat. No. 4,460,986, issued July 17, 1984 to Millouet, et al., discloses a tool having one or more acoustic transmitters and two or more acoustic receivers (or two or more transmitters and one or more receivers) and teaches a logging method wherein the tool is moved relative to the well between various events of transmission and recording of signals at the receivers. However, neither U.S. Pat. No 3,302,166 nor U.S. Pat. No. 4,460,986 suggests any technique for correcting both for variations in transmitter sensitivity and for variations in receiver sensitivity.

SUMMARY OF THE INVENTION

The invention is an acoustic well logging method employing a tool having at least two acoustic transmitters and at least two acoustic receivers. In one embodiment, the receivers are separated from each other along the longitudinal axis of the tool between the transmitters, with one receiver (the midpoint receiver) located midway between two of the transmitters. In another embodiment, the transmitters are separated from each other along the tool axis between the receivers, with one transmitter (the midpoint transmitter) located midway between two of the receivers. The term "midpoint transducer" will be used to denote the midpoint receiver in the first embodiment, and the midpoint transmitter in the second embodiment. The other receiver in the first embodiment and the other transmitter in the second embodiment will be referenced to below as the "non-midpoint transducer".

A first acoustic signal associated with a transmitter-receiver pair including the midpoint transducer is recorded. A second acoustic signal associated with the non-midpoint transducer is also recorded. The tool is then moved, uphole or downhole, so that the midpoint transducer occupies substantially the same position relative to the longitudinal axis of the well as did the other transducer associated with the first acoustic signal (the "first spanning transducer") when the first signal was recorded. When the tool is in the new position, a third acoustic signal associated with the midpoint transducer and the second spanning transducer (i.e. the transducer other than the midpoint transducer, non-midpoint transducer, and first spanning transducer) is recorded. Also when the tool is in the new position, a fourth acoustic signal, associated with a transmitter-receiver pair including the non-midpoint transducer, is recorded.

Amplitude information is preferably extracted from the four recorded signals as follows. A fifth signal, whose Fourier amplitude spectrum is equivalent to that of the first signal divided by that of the third signal, is generated. A sixth signal, whose Fourier amplitude spectrum is equivalent to that of the second signal divided by that of the fourth signal, is generated. A seventh signal, whose Fourier amplitude spectrum is substantially independent of components associated with the transmitters and receivers, is finally generated from the fifth and sixth signals.

BRIEF DESCRIPTION OF THE DRAWINGS

FIG. 1 also indicates the position in which a particular receiver-transmitter pair of the tool would be, when the tool is moved uphole (or downhole) to a second position in the borehole in accordance with the inventive method.

FIG. 2 also indicates the position in which a particular receiver-transmitter pair of the tool would be, when the tool is moved uphole (or downhole) to the second position indicated in FIG. 1.

FIG. 3 also indicates the position in which two receiver-transmitter pairs of the tool would be, when the tool is moved to a second position in the borehole in accordance with the inventive method.

DETAILED DESCRIPTION OF THE PREFERRED EMBODIMENTS

Figure 1:
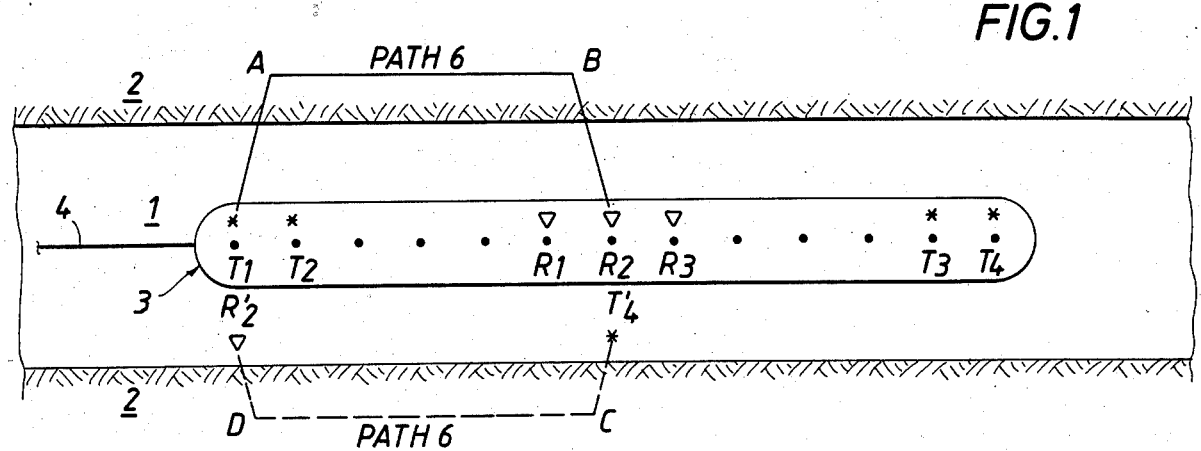
FIG. 1 is a simplified cross-sectional view of an acoustic logging tool of the type employed in practicing the inventive method. The tool is shown in a first position in a borehole.

FIG. 1 is a simplified cross-sectional view of a logging tool (identified by reference numeral 3) of the type that may be employed in practicing the inventive method. Tool 3 is suspended from wireline 4 at a first position in borehole 1 (sometimes alternatively referred to herein as well 1). Borehole 1 traverses subterranean formation 2 to be investigated. Borehole 1 will typically contain fluid.

Tool 3 includes acoustic transmitters $T_1$, $T_2$, $T_3$, and $T_4$, and also includes acoustic receivers $R_1$, $R_2$, and $R_3$. The transmitters and receivers (collectively referred to as transducers) are positioned in tool 3 such that each is separated from the other along the longitudinal axis of tool 3, and such that receiver $R_2$ is positioned substantially midway between transmitters $T_1$ and $T_4$. The distance between transmitter $T_1$ and receiver $R_1$ is thus different than the distance between transmitter $T_4$ and receiver $R_1$. Suitable acoustic transducers may be selected from those commercially available.

In accordance with the invention, transmitter $T_1$ is fired to generate acoustic wave energy that will propagate through a portion of formation 2 opposite the tool portion between transmitter $T_1$ and receiver $R_2$, and this wave is detected at receiver $R_2$ and recorded. The average path of this acoustic wave energy is schematically represented by path 6 of FIG. 1. It should be recognized that the three-dimensional region of which path 6 is a partial two-dimensional projection, is generally symmetrical with respect to rotation about the tool axis. Thus, the central portion of path 6 represented by the horizontal line segment between points A and B in FIG. 1 actually represents a cylindrical region that surrounds well 1.

Figure 2:
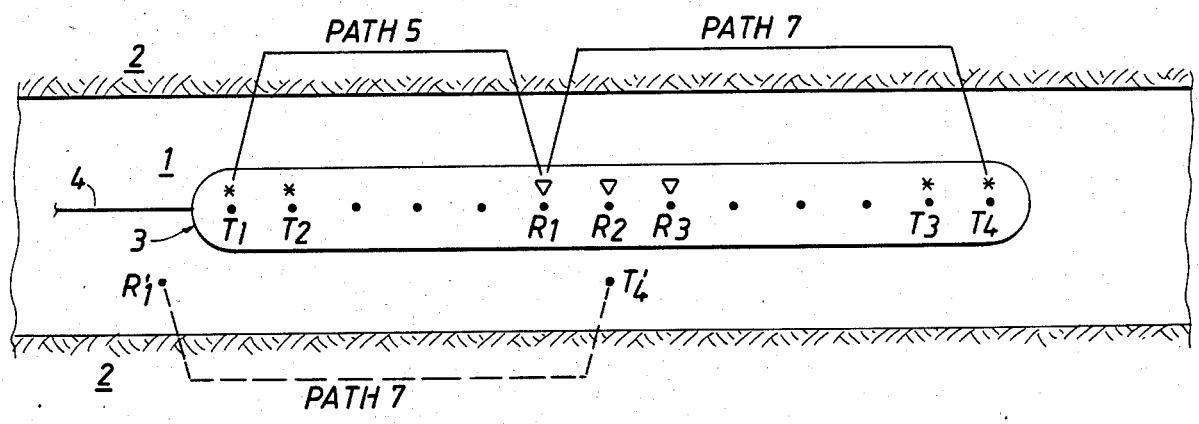
FIG. 2 is another simplified cross-sectional view of the tool of FIG. 1, in the first position shown in FIG. 1, illustrating the paths of two acoustic signals received by one acoustic receiver of the tool.

FIG. 2 is another view of tool 3 of FIG. 1, identical to the view of FIG. 1. FIG. 2, however, shows schematically several different paths of acoustic waves generated and received by different transmitter-receiver pairs than are associated with path 6 of FIG. 1.

In accordance with the invention, transmitter $T_1$ is also fired to generate acoustic wave energy that will propagate through a section of formation 2 opposite the tool portion between $T_1$ and $R_1$, this wave is detected at $R_1$ and recorded. The average path of this second acoustic wave is schematically represented in FIG. 2 by path 5.

It is contemplated that $T_1$ may either be fired once or twice (once for each recording). If $T_1$ is fired twice, tool 3 may be stationary with respect to formation 2 between the firings of transmitters $T_1$, or tool 3 may move a short distance uphole (or downhole) between firings of transmitter $T_1$. This short distance must be small relative to the distance between $R_2$ and $T_1$ (or $T_4$).

In accordance with the embodiment of the invention described with reference to FIGS. 1 and 2, tool 3 is next moved downhole or uphole to a second position in which midpoint receiver $R_2$ occupies substantially the same position along the well axis as did transmitter $T_1$ when $T_1$ was initially fired. This new position of receiver $R_2$ is represented by symbol $R_2'$ in FIG. 1. Similarly, the other transmitters and receivers will move, with the tool, to new positions along the well axis. The new positions of transmitter $T_4$ and $R_1$ are represented by symbols $T_4'$ and $R_1'$, respectively, in FIGS. 1 and 2. While in this new position, $T_4$ is fired to generate energy which will propagate through substantially the same portion of formation 2 as did the acoustic wave represented by path 6 of FIG. 1, and this wave is detected at receiver $R_2$ and recorded. Thus, the three-dimensional region through which the wave energy transmitted from $T_4$ and received by $R_2$ propagates is substantially the same as that through which the wave transmitted by $T_1$ and detected by $R_2$ propagated when the tool was in its first position relative to formation 2. Accordingly in FIG. 1, the dashed portion of path 6 including the dashed segment between points C and D spans the same depth interval along the well axis as does the line segment between points A and B, and the three-dimensional acoustic wave travel regions associated with segments AB and CD overlap.

Also while tool 3 is approximately in the second (new) position, transmitter $T_4$ is fired to generate an acoustic wave that will propagate through a region of formation 2 and this acoustic wave is detected at receiver $R_1$ and recorded. The average path of this fourth acoustic wave is schematically represented in FIG. 2 by dashed path 7.

It is contemplated that tool 3 may be stationary in the second position between the firing of transmitters $T_1$ and $T_4$, or that tool 3 may move a short distance uphole (or downhole) between the two firings. This short distance must be small relative to the distance between $T_1$ and $R_1$.

In a preferred embodiment of the invention, the four recorded signals are processed as follows to extract from them amplitude information that is substantially independent of components associated with the transmitters and receivers. The Fourier amplitude spectrum of each recorded signal will be represented by the following lowing notation: $|T|\cdot|\text{path}|\cdot|R|$, where $|\text{path}|$ is the Fourier amplitude spectrum of travel path of the acoustic wave detected at receiver R, and where $|R|$ and $|T|$ are the Fourier amplitude spectra, respectively, of receiver R at which the acoustic wave energy was received, and of transmitter T from which the acoustic wave energy was transmitted.

A ratio of the amplitude spectra of transmitters $T_1$ and $T_4$ is given by dividing the amplitude spectrum of the first recorded signal described above by that of the third received signal described above:

$$\frac{|T_1|\cdot|\text{path }6|\cdot|R_2|}{|T_4|\cdot|\text{path }6|\cdot|R_2|} = |T_1|/|T_4|. \quad (1)$$

$R_2$ is common to both recorded signals, and since the two acoustic waves normally travel through the formation within seconds of each other, the travel path characteristics (both denoted by the same symbol, $|\text{path }6|$) may be considered to be equivalent since both their borehole and formation portions overlap.

The amplitude spectrum of the second signal described above is then divided by that of the fourth signal described above to generate a signal having amplitude spectrum equivalent to the following ratio of amplitude spectra:

$$\frac{|T_1|\cdot|\text{path }5|\cdot|R_1|}{|T_4|\cdot|\text{path }7|\cdot|R_1|} \quad (2)$$

By producing signals having amplitude spectra equivalent to those of equations (1) and (2), and then dividing one of these two signals by the other, one obtains a signal having Fourier amplitude spectrum equal to:

$$|T_1|/|T_4| \div (|T_1|\cdot|\text{path }5|\cdot|R_1|/|T_4|\cdot\text{path }7|\cdot|R_1|) =$$
$$|\text{path }7|/|\text{path }5| \quad (3)$$

Thus, the signal whose amplitude spectrum is indicated by equation (3) (the "seventh" signal) approximates a transfer function whose amplitudes are indicative of formation parameters. Furthermore, this seventh signal has an amplitude spectrum indepent of both transmitter components ($|T|$) and receiver components ($|R|$). Thus, the inventive method results in generation of a signal (the seventh signal) including amplitude information that is not corrupted by transmitter and receiver effects for a particular tool position. As the tool position changes, new corrective signals are determined to generate uncorrupted formation information from the data themselves.

Numerous variations on the embodiment described above are within the scope of the invention. For example, in one variation, receiver $R_3$ is used in place of receiver $R_1$ to generate amplitude information (i.e. a transfer function) regarding a different pair of formation regions than those represented by the signal with amplitude spectrum equal to $|\text{path }7|/|\text{path }5|$. Alternatively, both transfer functions may be generated by recording three signals at receiver $R_1$, $R_2$, and $R_3$ at both the first tool position and the second tool position, and processing both the pairs of signals associated with $R_1$ and $R_2$, and the pairs of signals associated with $R_2$ and $R_3$ in the manner described above with reference to equations (1), (2), and (3).

In other variations, a tool having more than three receivers, or a tool having two, three, or more than four transmitters, is employed. In each of these variations, at least two pairs of signals must be recorded. The first pair is associated with common travel paths to the same receiver (one travel path for acoustic wave energy propagating generally uphole and the other for acoustic wave energy propagating generally downhole). The second pair of signals is associated with the same two transmitters as are signals in the first pair, but with a different receiver than are the signals in the first pair. Additional pairs of signals, bearing the same relation to the first pair as does the second pair, may also be generated. The first pair of recorded signals, and each of the additional pairs are preferably processed in the manner described with reference to equations (1), (2), and (3) above.

Another preferred embodiment of the invention will be described with reference to FIG. 3. In this embodiment, the positions of the transmitters and receivers of the tool are interchanged relative to the FIG. 1 embodiment. Thus, acoustic logging tool 13 of FIG. 3 includes an acoustic transmitter $T_1$ positioned substantially midway between two receivers, $R_1$ and $R_4$. A second acoustic transmitter, $T_2$, is separated from $T_1$ along the longitudinal tool axis between receivers $R_1$ and $R_2$. Additional receivers $R_2$ and $R_3$ are positioned at separated locations along the tool axis outside the segment spanned by transmitters $T_1$ and $T_2$.

Figure 3:
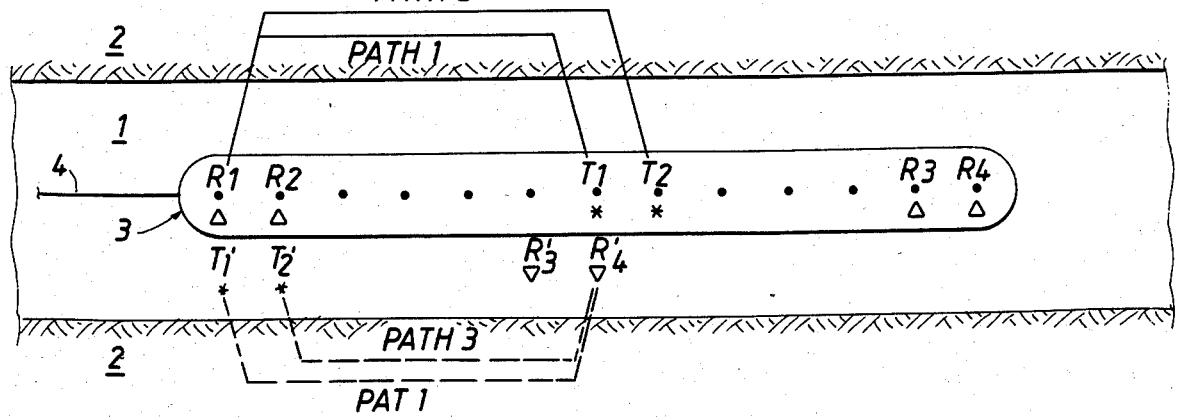
FIG. 3 is a simplified cross-sectional view of an alternative embodiment of an acoustic logging tool that may be employed in practicing the inventive method. The tool is in a first position in the borehole. The paths of two acoustic signals received by one acoustic receiver of the tool are shown.

In a preferred embodiment of the invention, tool 13 of FIG. 3 is operated as follows. Transmitters $T_1$ and $T_2$ are each fired when the tool is in substantially the same position in the well. The acoustic wave energy generated at $T_1$ propagates through a portion of formation 2 and is detected at $R_1$ and recorded. The region through which this wave propagates is represented by path 1 of FIG. 3. Similarly, acoustic wave energy generated at $T_2$ propagates through a portion of formation 2, is detected at $R_1$ and is recorded. The region through which this wave propagates is represented by path 2 of FIG. 3.

Tool 13 is next moved uphole (or downhole) to a new position relative to formation 2 such that transmitter $T_1$ occupies approximately the same position relative to the borehole axis as did receiver $R_1$ in the original tool position. The positions (relative to the borehole axis) of transmitters $T_1$ and $T_2$ and receivers $R_3$ and $R_4$ in this new tool position are indicated in FIG. 3 by the symbols $T_1'$, $T_2'$, $R_3'$, and $R_4$ respectively.

In the new position, $T_1$ and $T_2$ are each fired again. The arrival of acoustic wave energy generated by $T_1$ and $T_2$ are detected at $R_4$ and each detected arrival is recorded. The regions through which the wave energy generated at $T_1$ and $T_2$ propagate are represented by dashed paths 1 and 3, respectively, in FIG. 3.

Similarly to the FIG. 1 embodiment, the region through which the wave associated with the pair ($T_1$, $R_1$), and the wave associated with the pair ($T_1$, $R_4$), propagate may be considered to be identical, and both are thus represented by path 1.

The four recorded signals described with reference to FIG. 3 are preferably processed in a manner similar to that described above with reference to equations (1), (2), and (3). The ratio of the Fourier amplitude spectra of receivers $R_1$ and $R_4$ is given (using the same notation described above) by dividing the amplitude spectrum of the first recorded signal described above by that of the third recorded signal described above:

$$\frac{|T_1| \cdot |\text{path 1}| \cdot |R_1|}{|T_1| \cdot |\text{path 1}| \cdot |R_4|} = |R_1|/|R_4| \quad (4)$$

The travel path characteristics of these two signals may be considered to be equivalent since both signals are normally recorded within seconds of each other and both the borehole and formation portions of the two travel paths overlap.

The amplitude spectrum of the second signal described above is then divided by that of the fourth signal described above to generate a signal having Fourier amplitude spectrum equivalent to the following ratio of amplitude spectra:

$$\frac{|T_2| \cdot |\text{path 2}| \cdot |R_1|}{|T_2| \cdot |\text{path 3}| \cdot |R_4|} \quad (5)$$

By producing signals having amplitude spectra equivalent to those of equations (4) and (5), and then dividing one of these signals by the other, one obtains a signal having Fourier amplitude spectrum equal to:

$$|R_1|/|R_4| \div [|T_2| \cdot |\text{path 2}| \cdot |R_1|]/[|T_2| \cdot |\text{path 3}| \cdot |R_4|] = |\text{path 3}|/|\text{path 2}| \quad (6)$$

The signal having the amplitude spectrum shown in equation (6) approximates a transfer function whose amplitudes are indicative of formation parameters, and are independent of transmitter components ($|T|$) and receiver components ($|R|$).

Numerous variations on the inventive embodiment described with reference to FIG. 3 are with the scope of the invention. The above discussion regarding variations on the FIG. 1 embodiment applies equally to the FIG. 3 embodiment.

The above description is merely illustrative of the invention. It is contemplated that various changes in the details of the structures and methods described may be within the scope of the invention as defined by the appended claims.

I claim:

1. An acoustic well logging method, employing a tool having a longitudinal axis and including a set of at least four acoustic transducers spaced from each other along the axis, where at least two of the transducers are of the transmitting kind and at least two are of the receiving kind, and where a midpoint transducer is positioned along the axis substantially midway between a pair of spanning transducers, and a non-midpoint transducer is positioned between the spanning transducers, where each pair including one of the spanning transducers and the midpoint transducer is a transmitter-receiver pair, and each pair including one of the spanning transducers and the non-midpoint transducer is a transmitter-receiver pair, including the steps of:
    (a) when the tool is in a first position in the well, recording a first acoustic signal associated with a transmitter-receiver pair including the midpoint transducer and a first spanning transducer;
    (b) when the tool is at approximately the first position, recording a second acoustic signal associated with a transmitter-receiver pair including the non-midpoint transducer;
    (c) when the tool is in a second position in the well in which the midpoint transducer occupies substantially the same point along the longitudinal axis of the well as did one spanning transducer when the tool was in the first position, recording a third acoustic signal associated with a transmitter-receiver pair including the midpoint transducer and the spanning transducer other than the first spanning transducer; and
    (d) when the tool is approximately in the second position, recording fourth acoustic signal associated with a transmitter-receiver pair including the non-midpoint transducer.

2. The method of claim 1, also including the steps of:
    (e) generating a fifth signal whose Fourier amplitude spectrum is equivalent to that of the first signal divided by that of the third signal;
    (f) generating a sixth signal whose Fourier amplitude spectrum is equivalent to that of the second signal divided by that of the fourth signal; and
    (g) generating, from the fifth signal and the sixth signal, a seventh signal whose Fourier amplitude spectrum is independent of components associated with the transmitters and receivers.

3. The method of claim 1 or 2, wherein the midpoint transducer is a transmitter.

4. The method of claim 1 or 2, wherein the midpoint transducer is a receiver.

5. An acoustic well logging method, employing a tool having a longitudinal axis and including a first acoustic transmitter and a second acoustic transmitter separated from the first transmitter by a first distance along the axis, a first acoustic receiver positioned between the transmitters at a position along the axis substantially midway between the transmitters, and a second acoustic receiver positioned between the transmitter and separated from the first receiver by a second distance along the axis where the second distance is not equal to the first distance, including the steps of:
    when the tool is at a first position in the well, recording at the first receiver a first acoustic signal including energy generated at the first transmitter;
    when the tool is approximately at the first position, recording at the second receiver a second acoustic signal including energy generated at a transmitter selected from the group of the first and the second transmitter;
    moving the tool to a second position in the well such that the first receiver and second transmitter span substantially the same path along the axis of the well as did the first receiver and the first transmitter when the tool was in the first position;
    when the tool is at the second position, recording at the first receiver a third acoustic signal including energy generated at the second transmitter; and
    when the tool is approximately at the second position, recording at the second receiver a fourth acoustic signal including energy generated at the other transmitter selected from the group of the first and the second transmitter.

6. An acoustic well logging method, employing a tool having a longitudinal axis and including a first acoustic transmitter and a second acoustic transmitter separated from the first transmitter by a first distance along the axis, a first acoustic receiver positioned between the transmitters at a position along the axis substantially midway between the transmitters, and a second acoustic receiver positioned between the transmitters and separated from the first transmitter by a second distance along the axis, where the second distance is not equal to the first distance, including the steps of:

when the tool is at a first position in the well, recording at the first receiver a first acoustic signal including energy generated at the first transmitter;

when the tool is approximately at the first position in the well, recording at the second receiver a second acoustic signal including energy generated at the first transmitter;

moving the tool to a second position in the well such that the first receiver and second transmitter span substantially the same path along the axis of the well as did the first receiver and the first transmitter when the tool was in the first position;

when the tool is in the second position in the well, recording at the first receiver a third acoustic signal including energy generated at the second transmitter; and when the tool is approximately in the second position in the well, recording at the second receiver a fourth acoustic signal including energy generated at the second transmitter.

7. The method of claim 6, also including the steps of:

generating a fifth signal whose Fourier amplitude spectrum is equivalent to that of the first signal divided by that of the third signal;

generating a sixth signal whose Fourier amplitude spectrum is equivalent to that of the fourth signal divided by that of the second signal; and generating a seventh signal whose Fourier amplitude spectrum is equivalent to that of the fifth signal multiplied by that of the sixth signal.

8. The method of claim 5 or 6, wherein the tool also includes a third acoustic receiver positioned between the transmitters and separated from the first receiver and second receiver along the longitudinal axis of the tool, also including the steps of:

recording at the third receiver, when the tool is at the first position, a fifth acoustic signal including energy generated at the first transmitter; and recording at the third receiver, when the tool is approximately at the second position, a sixth acoustic signal including energy generated at the second transmitter.

9. The method of claim 5 or 6, wherein the tool also includes a third acoustic transmitter positioned along the longitudinal axis of the tool outside the segment of the tool axis spanned by the receivers.

10. An acoustic well logging method, employing a tool having a longitudinal axis and including a first acoustic receiver and a second acoustic receiver separated from the first receiver by a first distance along the axis, a first acoustic transmitter positioned between the receivers at a position along the axis substantially midway between the receivers, and a second acoustic transmitter positioned between the receivers and separated from the first receiver by a second distance along the axis, where the second distance is not equal to the first distance, including the steps of:

when the tool is at a first position in the well, recording at the first receiver a first acoustic signal including energy generated at the first transmitter;

when the tool is approximately at the first position in the well, recording at the first receiver a second acoustic signal including energy generated at the second transmitter;

moving the tool to a second position in the well such that the first transmitter and the second receiver span substantially the same segment along the axis of the well as did the first receiver and the first transmitter when the tool was in the first position;

when the tool is in the second position in the well, recording at the second receiver a third acoustic signal including energy generated at the first transmitter; and when the tool is in the second position in the well, recording at the second receiver a fourth acoustic signal including energy generated at the second transmitter.

11. The method of claim 10, also including the steps of:

generating a fifth signal whose Fourier amplitude spectrum is equivalent to that of the first signal divided by that of the third signal;

generating a sixth signal whose Fourier amplitude spectrum is equivalent to that of the fourth signal divided by that of the second signal; and generating a seventh signal whose Fourier amplitude spectrum is equivalent to that of the fifth signal multiplied by that of the sixth signal.

12. The method of claim 10, wherein the tool also includes a third acoustic transmitter positioned between the receivers and separated from the first transmitter and second transmitter along the axis, also including the steps of:

recording at the first receiver, when the tool is at the first position in the well, a fifth acoustic signal including energy generated at the third transmitter; and recording at the second receiver, when the tool is approximately at the second position in the well, a sixth acoustic signal including energy generated at the third transmitter.

13. The method of claim 10 or 11, wherein the tool also includes a third acoustic receiver positioned along the longitudinal axis of the tool outside the segment of the tool axis spanned by the transmitters.

* * * * *